(12) United States Patent
Hiratsuka

(10) Patent No.: US 10,607,071 B2
(45) Date of Patent: Mar. 31, 2020

(54) INFORMATION PROCESSING APPARATUS, NON-TRANSITORY COMPUTER READABLE RECORDING MEDIUM, AND INFORMATION PROCESSING METHOD

(71) Applicant: KYOCERA Document Solutions Inc., Osaka-shi, Osaka (JP)

(72) Inventor: Motoki Hiratsuka, Osaka (JP)

(73) Assignee: KYOCERA DOCUMENT SOLUTIONS, INC., Osaka (JP)

( * ) Notice: Subject to any disclaimer, the term of this patent is extended or adjusted under 35 U.S.C. 154(b) by 191 days.

(21) Appl. No.: 15/976,316

(22) Filed: May 10, 2018

(65) Prior Publication Data
US 2018/0330155 A1 Nov. 15, 2018

(30) Foreign Application Priority Data
May 15, 2017 (JP) ................. 2017-096180

(51) Int. Cl.
*G06K 9/00* (2006.01)
*H04N 1/00* (2006.01)

(52) U.S. Cl.
CPC ..... *G06K 9/00422* (2013.01); *G06K 9/00161* (2013.01); *G06K 9/00456* (2013.01);
(Continued)

(58) Field of Classification Search
CPC ........... G06K 9/00422; G06K 9/00161; G06K 9/00456; G06K 9/00899; G06K 9/00852;
(Continued)

(56) References Cited

U.S. PATENT DOCUMENTS 6,668,354 B1 * 12/2003 Chen .................. G06F 17/211
715/255
7,236,653 B2 * 6/2007 Constantin ........... G06K 9/2054
382/306

(Continued)

FOREIGN PATENT DOCUMENTS

| JP | 06046217 | 2/1994 |
| JP | 2008020506 | 1/2008 |
| JP | 2016225699 | 12/2016 |

*Primary Examiner* — Michael S Osinski
(74) *Attorney, Agent, or Firm* — Calfee, Halter & Griswold, LLP (57) ABSTRACT

An information processing method includes: obtaining a sheet-image obtained by scanning a sheet including a name-field, in which a name is to be handwritten, and handwritten-characters written in an area other than the name-field; recognizing the handwritten-characters in the sheet-image; generating handwriting-information indicating characteristics of each character of the recognized handwritten-characters; determining whether or not a name is written in the name-field in the sheet-image; where determining that no name is written, extracting, from a database that stores one or more persons' names, the persons' attributes, and handwriting-informations of the persons in association with each other, one or more names and handwriting-informations in association with a particular attribute, and generating a table; selecting one name stored in the table in association with the generated handwriting-information; generating a name-image indicating the selected name; and combining the name-image and the sheet-image to generate a combined-image.

12 Claims, 4 Drawing Sheets

(52) U.S. Cl.
CPC ..... *G06K 9/00899* (2013.01); *H04N 1/00331* (2013.01); *G06K 9/00852* (2013.01)

(58) Field of Classification Search
CPC .. G06K 9/2054; G06K 9/325; G06K 9/00469; G06K 9/00154; G06K 2209/01; H04N 1/00331; G06T 11/60
See application file for complete search history.

(56) References Cited

U.S. PATENT DOCUMENTS

| | | | | |
|---|---|---|---|---|
| 7,802,184 | B1* | 9/2010 | Battilana | G06F 17/276 |
| | | | | 715/256 |
| 8,189,920 | B2* | 5/2012 | Tomizawa | G06K 9/033 |
| | | | | 382/182 |
| 8,542,953 | B2* | 9/2013 | Maekawa | G06F 17/275 |
| | | | | 382/321 |
| 8,958,644 | B2* | 2/2015 | Schwartz | G06K 9/00402 |
| | | | | 382/181 |
| 9,298,685 | B2* | 3/2016 | Barrus | G06F 17/243 |
| 9,307,109 | B2* | 4/2016 | Inamoto | G06K 9/2063 |
| 9,390,089 | B2* | 7/2016 | Pitzo | G06F 16/93 |
| 9,418,315 | B1* | 8/2016 | Keogh | G06F 16/5846 |
| 9,922,400 | B2* | 3/2018 | Kashibuchi | G06T 11/60 |
| 10,013,624 | B2* | 7/2018 | Gray | G06K 9/2054 |
| 2006/0197928 | A1* | 9/2006 | Hirai | G06F 16/5854 |
| | | | | 355/30 |
| 2007/0081179 | A1* | 4/2007 | Nishida | G06F 17/275 |
| | | | | 358/1.11 |
| 2008/0181501 | A1* | 7/2008 | Faraboschi | G06F 3/03545 |
| | | | | 382/179 |
| 2009/0138284 | A1* | 5/2009 | Guadagna | G06Q 10/10 |
| | | | | 705/3 |
| 2010/0179962 | A1* | 7/2010 | Schuster | G06F 17/243 |
| | | | | 707/769 |
| 2010/0228693 | A1* | 9/2010 | Dawson | G06F 17/2705 |
| | | | | 706/12 |
| 2011/0271173 | A1* | 11/2011 | Aii-Mokhtar | G06F 17/243 |
| | | | | 715/226 |
| 2012/0087537 | A1* | 4/2012 | Liu | G06K 9/00469 |
| | | | | 382/100 |
| 2013/0215474 | A1* | 8/2013 | Caton | H04N 1/0087 |
| | | | | 358/3.28 |
| 2014/0049788 | A1* | 2/2014 | Inamoto | G06K 9/2063 |
| | | | | 358/1.11 |
| 2014/0146200 | A1* | 5/2014 | Scott | G06K 9/34 |
| | | | | 348/231.99 |
| 2016/0092729 | A1* | 3/2016 | Dobashi | G06K 9/00469 |
| | | | | 382/218 |
| 2016/0098596 | A1* | 4/2016 | Gopalakrishnan | |
| | | | | G06K 9/00456 |
| | | | | 382/224 |
| 2017/0163828 | A1* | 6/2017 | Kimura | G06K 9/00463 |
| 2018/0035007 | A1* | 2/2018 | Kashimoto | H04N 1/3872 |
| 2018/0046708 | A1* | 2/2018 | Stewart | G06K 9/00456 |
| 2018/0301222 | A1* | 10/2018 | Dew, Sr. | G06Q 50/24 |
| 2018/0302227 | A1* | 10/2018 | Seegebarth | G06F 21/43 |
| 2019/0026579 | A1* | 1/2019 | Hall | G06K 9/03 |
| 2019/0188251 | A1* | 6/2019 | Liu | G06F 17/243 |
| 2019/0303662 | A1* | 10/2019 | Madhani | G06K 9/00456 |
| 2019/0303665 | A1* | 10/2019 | Sharov | G06K 9/00228 |
| 2019/0311210 | A1* | 10/2019 | Chatterjee | G06F 16/58 |
| 2019/0347480 | A1* | 11/2019 | Garces | G06K 9/00456 |

* cited by examiner

INFORMATION PROCESSING APPARATUS, NON-TRANSITORY COMPUTER READABLE RECORDING MEDIUM, AND INFORMATION PROCESSING METHOD

INCORPORATION BY REFERENCE

This application claims the benefit of Japanese Priority Patent Application JP 2017-096180 filed May 15, 2017, the entire contents of which are incorporated herein by reference.

FIELD

The present disclosure relates to an information processing apparatus capable of obtaining a sheet-image obtained by scanning a sheet including handwritten-characters, and generating handwriting-information of the handwritten-characters in the sheet-image. The present disclosure further relates to a non-transitory computer readable recording medium that records an information processing program, and an information processing method.

BACKGROUND

There is known a technique of obtaining a sheet-image obtained by scanning a sheet including handwritten-characters, and identifying a writer on a basis of handwriting-information of the handwritten-characters in the sheet-image.

It is desirable to identify a writer more and more accurately in the technique of obtaining a sheet-image obtained by scanning a sheet including handwritten-characters, and identifying a writer on a basis of handwriting-information of the handwritten-characters in the sheet-image.

SUMMARY

According to an embodiment of the present disclosure, there is provided an information processing apparatus, including:
a processor that operates as
an image obtaining unit that obtains a sheet-image obtained by scanning a sheet including a name-field, in which a name is to be handwritten, and handwritten-characters written in an area other than the name-field,
a character recognizing unit that recognizes the handwritten-characters in the sheet-image,
a handwriting-information generating unit that generates handwriting-information indicating characteristics of each character of the recognized handwritten-characters,
a name-field determining unit that determines whether or not a name is written in the name-field in the sheet-image,
a writer determining unit that,
where the name-field determining unit determines that no name is written,
extracts, from a database that stores one or more persons' names, the persons' attributes, and handwriting-informations of the persons in association with each other, one or more names and handwriting-informations in association with a particular attribute, and generates a table, and
selects one name stored in the table in association with the generated handwriting-information, and
an image generating unit that
generates a name-image indicating the selected name, and combines the name-image and the sheet-image to generate a combined-image.

According to an embodiment of the present disclosure, there is provided a non-transitory computer readable recording medium that records an information processing program executable by a processor of an information processing apparatus, the information processing program causing the processor of the information processing apparatus to operate as
an image obtaining unit that obtains a sheet-image obtained by scanning a sheet including a name-field, in which a name is to be handwritten, and handwritten-characters written in an area other than the name-field,
a character recognizing unit that recognizes the handwritten-characters in the sheet-image,
a handwriting-information generating unit that generates handwriting-information indicating characteristics of each character of the recognized handwritten-characters,
a name-field determining unit that determines whether or not a name is written in the name-field in the sheet-image,
a writer determining unit that,
where the name-field determining unit determines that no name is written,
extracts, from a database that stores one or more persons' names, the persons' attributes, and handwriting-informations of the persons in association with each other, one or more names and handwriting-informations in association with a particular attribute, and generates a table, and
selects one name stored in the table in association with the generated handwriting-information, and
an image generating unit that
generates a name-image indicating the selected name, and combines the name-image and the sheet-image to generate a combined-image.

According to an embodiment of the present disclosure, there is provided an information processing method, including:
obtaining a sheet-image obtained by scanning a sheet including a name-field, in which a name is to be handwritten, and handwritten-characters written in an area other than the name-field;
recognizing the handwritten-characters in the sheet-image;
generating handwriting-information indicating characteristics of each character of the recognized handwritten-characters;
determining whether or not a name is written in the name-field in the sheet-image;
where determining that no name is written,
extracting, from a database that stores one or more persons' names, the persons' attributes, and handwriting-informations of the persons in association with each other, one or more names and handwriting-informations in association with a particular attribute, and generating a table;
selecting one name stored in the table in association with the generated handwriting-information;
generating a name-image indicating the selected name; and
combining the name-image and the sheet-image to generate a combined-image.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings. In the present embodiment, an image forming apparatus (Multifunction Peripheral, hereinafter simply referred to as MFP) will be described as an information processing apparatus.

1. Hardware Configuration of Image Forming Apparatus

Figure 1:
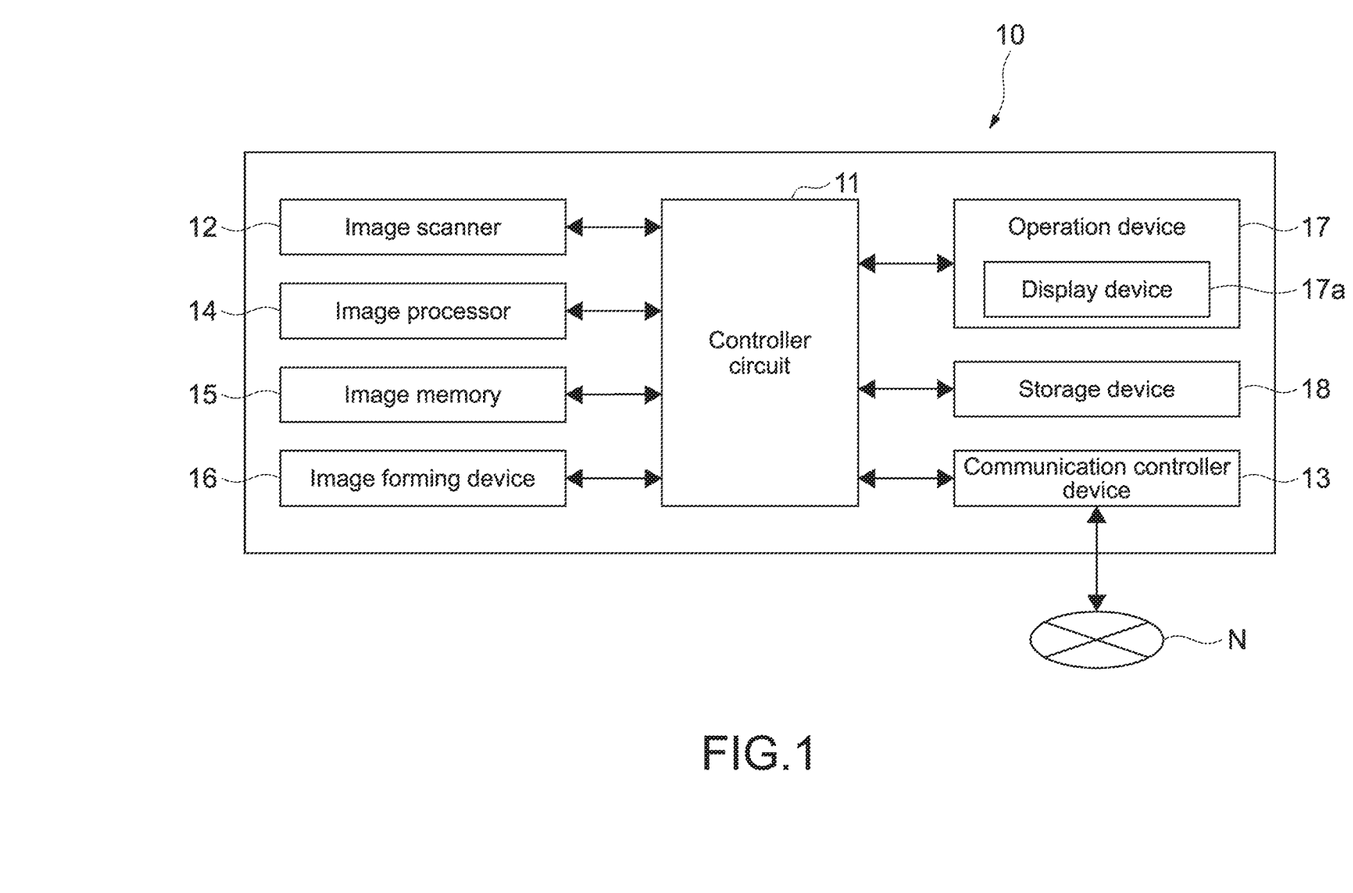
FIG. 1 shows a hardware configuration of an image forming apparatus according to an embodiment of the present disclosure.

FIG. 1 shows a hardware configuration of an image forming apparatus according to an embodiment of the present disclosure.

An MFP 10 includes a controller circuit 11. The controller circuit 11 includes a CPU (Central Processing Unit), i.e., a processor, a RAM (Random Access Memory), a ROM (Read Only Memory), i.e., a memory, dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to an image scanner 12, an image processor 14, an image memory 15, an image forming device 16, an operation device 17, a storage device 18, a communication controller device 13, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a document image read by the image scanner 12 or data to be printed by the image forming device 16.

The image forming device 16 (printer) forms an image of image data and the like read by the image scanner 12.

The operation device 17 includes a touch panel device and an operation key device that accept user's instructions on various operations and processing executable by the MFP 1. The touch panel device includes a display device 17a such as an LCD (Liquid Crystal Display) and an organic EL (Electroluminescence) display including a touch panel.

The communication controller device 13 (communication device) is an interface used for connecting to the network N.

The storage device 18 is a large-volume storage device such as an HDD (Hard Disk Drive) that stores a document image read by the image scanner 12, and the like. The storage device 18 may further include a detachably-connected mobile storage medium (for example, a USB (Universal Serial Bus) memory) and its interface.

2. Functional Configuration of Image Forming Apparatus

Figure 2:
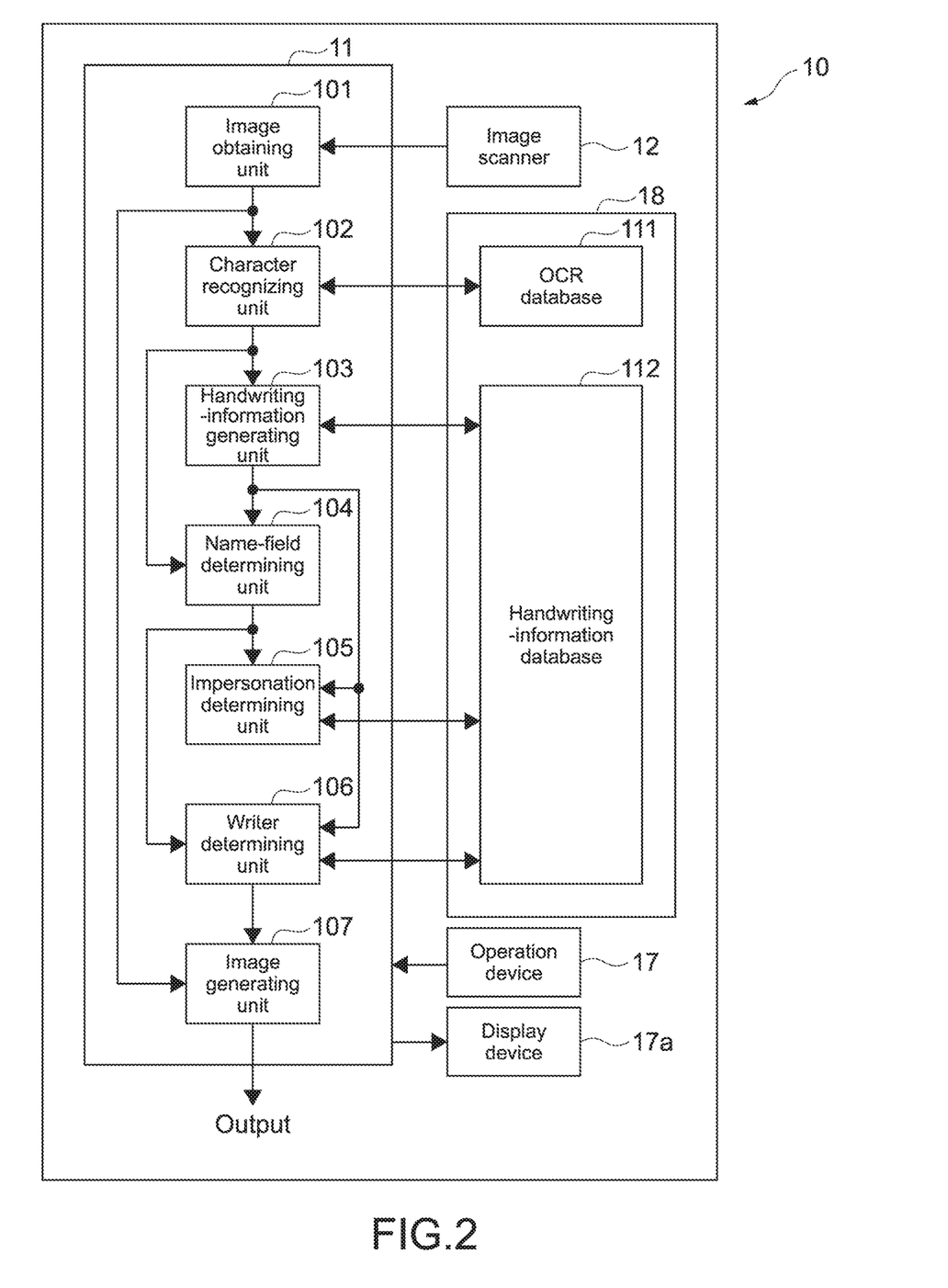
FIG. 2 shows a functional configuration of the image forming apparatus.

FIG. 2 shows a functional configuration of the image forming apparatus.

The CPU (processor) of the controller 11 of the MFP 10 loads an information processing program recorded in the ROM (memory) in the RAM and executes the program to thereby operate as the functional blocks, i.e., the image obtaining unit 101, the character recognizing unit 102, the handwriting-information generating unit 103, the name-field determining unit 104, the impersonation determining unit 105, the writer determining unit 106, and the image generating unit 107.

The image obtaining unit 101 obtains a sheet-image obtained by scanning a sheet including a name-field, in which a name is to be handwritten, and a handwritten-characters written in an area other than the name-field.

The character recognizing unit 102 recognizes the handwritten-characters in the sheet-image.

The handwriting-information generating unit 103 generates handwriting-information indicating characteristics of each character of the recognized handwritten-characters recognized by the character recognizing unit 102.

The name-field determining unit 104 determines whether or not a name is written in the name-field in the sheet-image.

Where the name-field determining unit 104 determines that a name is written, the impersonation determining unit 105 determines whether or not the handwriting-information generated by the handwriting-information generating unit 103 is stored in the handwriting-information database 112 in association with the name handwritten in the name-field. Where the impersonation determining unit 105 determines that the handwriting-information generated by the handwriting-information generating unit 103 is not stored in the handwriting-information database 112 in association with the name handwritten in the name-field, the impersonation determining unit 105 extracts a name stored in the handwriting-information database 112 in association with the handwriting-information generated by the handwriting-information generating unit 103.

The handwriting-information database 112 stores one or more persons' names, the persons' attributes, and handwriting-informations of the persons in association with each other.

Where the name-field determining unit 104 determines that no name is written, the writer determining unit 106 extracts, from the handwriting-information database 112, one or more names and handwriting-informations in association with a particular attribute, and generates a searchable-table. The writer determining unit 106 selects one name stored in the searchable-table in association with the handwriting-information generated by the handwriting-information generating unit 103. The writer determining unit 106, where the searchable-table stores a plurality of names in association with the handwriting-information generated by the handwriting-information generating unit 103, treats the plurality of names as candidates, excludes a name handwritten in a name-field of another sheet-image from the candidates, and selects one non-excluded and remaining name.

The image generating unit 107 generates a name-image indicating the name selected by the writer determining unit 106, and combines the name-image and the sheet-image to generate a combined-image.

3. Operational Flow of Image Forming Apparatus

Figure 3:
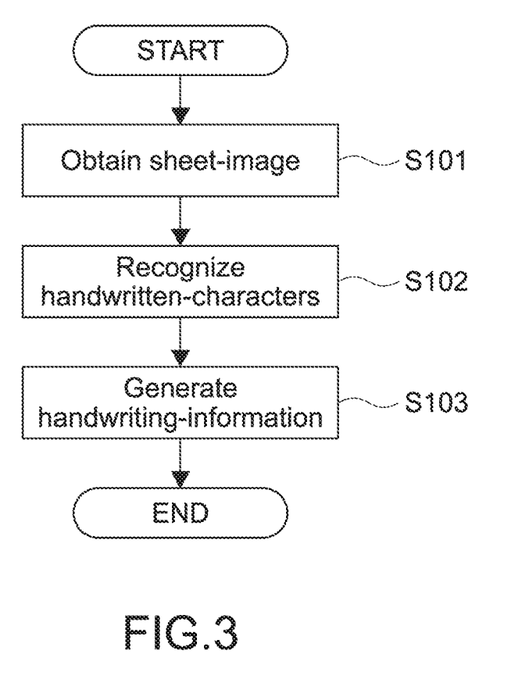
FIG. 3 shows an operational flow (first time) of the image forming apparatus.

FIG. 3 shows an operational flow (first time) of the image forming apparatus.

The image scanner 12 scans a sheet set on a feeder or the like, and generates a sheet-image. The "sheet" includes a name-field, in which a name is to be handwritten, and handwritten-characters written in an area other than the name-field. A name may be handwritten or may (intentionally or unintentionally) not be written in the "name-field". The "area other than the name-field" is, for example, an answer-field in which an answer is handwritten. Examples of this kind of "sheet" include answer sheets for examinations of schools, cram schools, and the like, and questionnaire sheets.

The image obtaining unit 101 obtains a sheet-image (strictly speaking, image data) generated by the image scanner 12 (Step S101). The image obtaining unit 101 supplies the obtained sheet-image to the character recognizing unit 102.

The character recognizing unit 102 obtains a sheet-image from the image obtaining unit 101. The character recognizing unit 102 recognizes handwritten-characters in the sheet-image (Step S102). The "handwritten-characters" include characters (name) handwritten in the name-field, characters (attribute) handwritten in an attribute-field, and characters (answers) handwritten in the area other than the name-field. In detail, the character recognizing unit 102 detects edges and thereby extracts the handwritten-characters. The character recognizing unit 102 refers to the OCR (Optical Character Recognition) database 111, and identifies the extracted handwritten-characters. In detail, an image pattern of a character and a character code are registered in association with each other one-to-one in the OCR database 111. The character recognizing unit 102 searches the OCR database 111 for the image pattern indicating an extracted character, and obtains the character code in association with the retrieved image pattern. The character recognizing unit 102 obtains the character codes of all the handwritten-characters. The character recognizing unit 102 combines the character codes of the characters (name) handwritten in the name-field, and thereby recognizes the name. The character recognizing unit 102 combines the character codes of the characters (attribute) handwritten in the attribute-field, and thereby recognizes the attribute. The "attribute" is information indicating what a person belongs to such as a school name, a school year, and a class.

The handwriting-information generating unit 103 generates handwriting-information indicating characteristics of each character of the handwritten-characters recognized by the character recognizing unit 102 (Step S103). For example, the "handwriting-information" relates to denseness (thickness, darkness) or weakness (thinness, paleness) of start-of-writing, roundness of curves, angles of corners, denseness (thickness, darkness) or weakness (thinness, paleness) of end-of-writing, and the like of each character. The handwriting-information generating unit 103 stores the generated handwriting-information of each character, and the name and the attribute recognized by the character recognizing unit 102 in the handwriting-information database 112 in association with each other.

Figure 4:
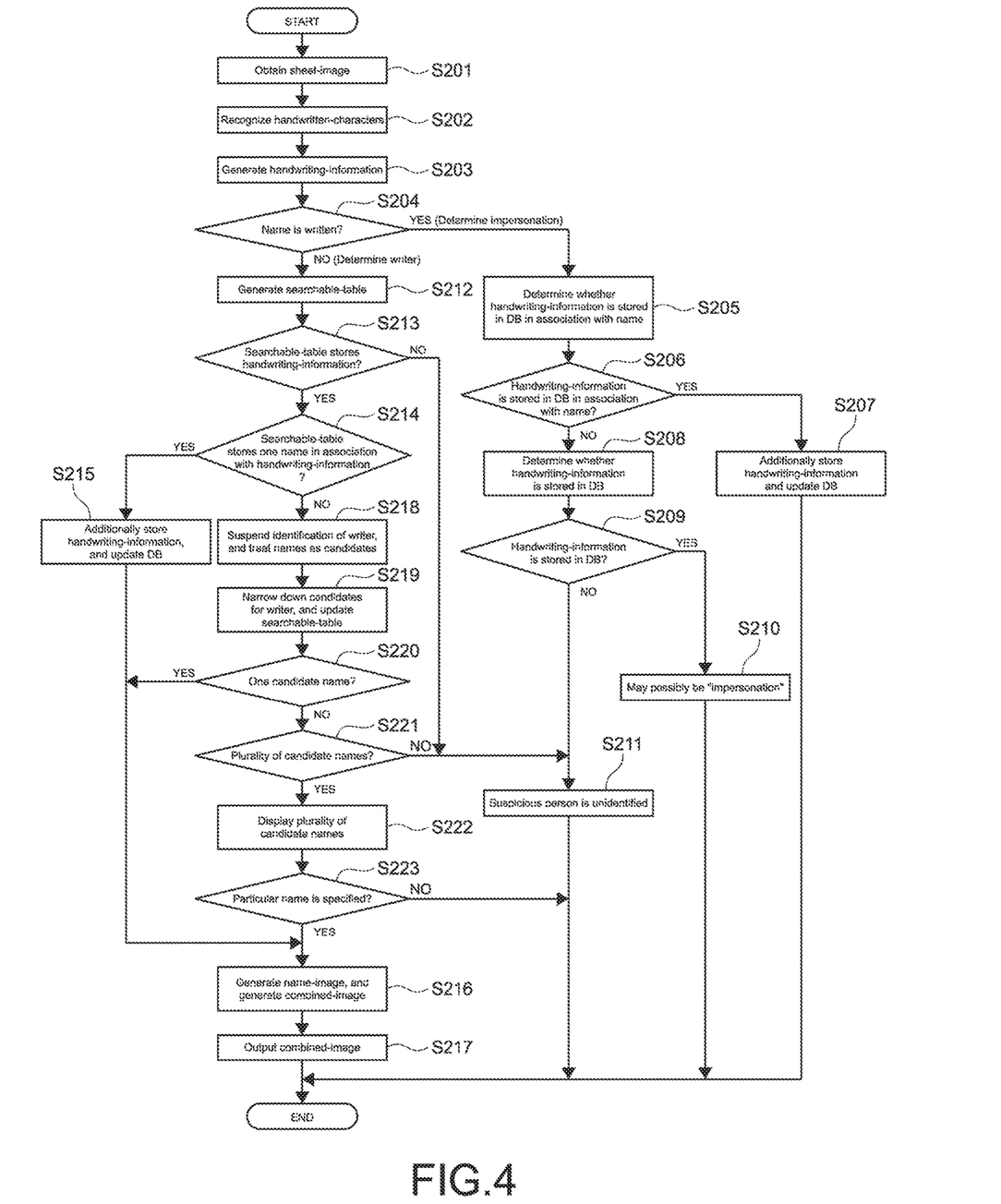
FIG. 4 shows an operational flow (second time and thereafter) of the image forming apparatus.

FIG. 4 shows an operational flow (second time and thereafter) of the image forming apparatus.

The image obtaining unit 101 obtains a sheet-image (strictly speaking, image data) generated by the image scanner 12 (Step S201, similar to Step S101 of FIG. 3). The image obtaining unit 101 supplies the obtained sheet-image to the character recognizing unit 102.

The character recognizing unit 102 obtains a sheet-image from the image obtaining unit 101. The character recognizing unit 102 recognizes handwritten-characters in the sheet-image (Step S202, similar to Step S102 of FIG. 3). The character recognizing unit 102 combines the character codes of the characters (name) handwritten in the name-field, and thereby recognizes the name. The character recognizing unit 102 combines the character codes of the characters (attribute) handwritten in the attribute-field, and thereby recognizes the attribute.

The handwriting-information generating unit 103 generates handwriting-information indicating characteristics of each character of the handwritten-characters recognized by the character recognizing unit 102 (Step S203, similar to Step S103 of FIG. 3).

The name-field determining unit 104 obtains the name recognized by the character recognizing unit 102, and determines whether or not a name is written in the name-field of the sheet-image (Step S204). Hereinafter, (1) a case where the name-field determining unit 104 determines that a name is written in the name-field of the sheet-image (Step S204, YES) and (2) a case where the name-field determining unit 104 determines that no name is written (typically, name-field is blank) in the name-field of the sheet-image (Step S204, NO) will be described separately.

(1) Where a name is written in the name-field of the sheet-image (Step S204, YES):

The impersonation determining unit 105 determines whether or not the handwriting-information generated by the handwriting-information generating unit 103 is stored in the handwriting-information database 112 in association with the name (name handwritten in name-field) recognized by the character recognizing unit 102 (Step S205).

If the handwriting-information is not in association with the name handwritten in the name-field, somebody may possibly have "impersonated" the person of this name, and handwritten the name and answers on this sheet. To the contrary, if the handwriting-information is in association with the name handwritten in the name-field, not the "impersonation", but the person of this name by himself may be highly likely to have handwritten the name and answers on this sheet.

The impersonation determining unit 105 determines that the handwriting-information is stored in the handwriting-information database 112 in association with the name handwritten in the name-field (not likely to be "impersonation") (Step S206, YES). In this case, the impersonation determining unit 105 supplies the handwriting-information generated by the handwriting-information generating unit 103 to the handwriting-information database 112 in association with the name (name handwritten in name-field) recognized by the character recognizing unit 102 to thereby additionally store the handwriting-information and update the handwriting-information database 112 (Step S207). In this way, by additionally storing the handwriting-information to the handwriting-information database 112 and updating the handwriting-information database 112, it is possible to identify a person on a basis of handwriting-information more and more accurately.

Meanwhile, the impersonation determining unit 105 determines that the handwriting-information is not stored in the handwriting-information database 112 in association with the name handwritten in the name-field (likely to be "impersonation") (Step S206, NO). In this case, the impersonation determining unit 105 determines whether or not a name is stored in the handwriting-information database 112 in association with the handwriting-information generated by the handwriting-information generating unit 103 (Step S208).

Where the impersonation determining unit 105 determines that a name is stored in the handwriting-information database 112 in association with the handwriting-information generated by the handwriting-information generating unit 103 (Step S209, YES), the impersonation determining unit 105 displays this name (name of a person who may possibly have "impersonated") on the display device 17a, and alerts a user (marker, etc.) (Step S210).

Meanwhile, where the impersonation determining unit 105 determines that no name is stored in the handwriting-information database 112 in association with the handwriting-information generated by the handwriting-information generating unit 103 (Step S209, NO), the impersonation determining unit 105 displays a message (suspicious person is unidentified) on the display device 17a, and alerts a user (marker, etc.) (Step S211).

(2) Where no name is written in the name-field of the sheet-image (Step S204, NO):

The writer determining unit 106 extracts one or more names and handwriting-informations in association with a particular attribute from the handwriting-information database 112, and generates a searchable-table (Step S212). The "particular attribute" is the attribute (class, etc.) of a person identified by a name to be written in the name-field (in which no name is written), and is specified on a basis of operations by a user (marker, etc.). In other words, the "searchable-table" is a table indicating the names and handwriting-informations of a plurality of persons who belong to the "particular attribute" (one class, etc.).

The writer determining unit 106 determines whether or not the generated searchable-table stores the handwriting-information generated by the handwriting-information generating unit 103 (Step S213). Where the writer determining unit 106 determines that the generated searchable-table does not store the handwriting-information generated by the handwriting-information generating unit 103 (Step S213, NO), the writer determining unit 106 displays a message (suspicious person is unidentified) on the display device 17a, and alerts a user (marker, etc.) (Step S211).

Meanwhile, the writer determining unit 106 determines that the generated searchable-table stores the handwriting-information generated by the handwriting-information generating unit 103 (Step S213, YES). In this case, the writer determining unit 106 determines whether the generated searchable-table stores a plurality of names or only one name in association with the handwriting-information generated by the handwriting-information generating unit 103 (Step S214).

Where the writer determining unit 106 determines that the generated searchable-table stores only one name in association with the handwriting-information generated by the handwriting-information generating unit 103, the writer determining unit 106 selects this one name (Step S214, YES). In this case, the person of the selected name may be highly likely to be a writer. So the writer determining unit 106 supplies the handwriting-information generated by the handwriting-information generating unit 103 to the handwriting-information database 112 in association with the name to thereby additionally store the handwriting-information and update the handwriting-information database 112 (Step S215). In this way, by additionally storing the handwriting-information to the handwriting-information database 112 and updating the handwriting-information database 112, it is possible to identify a person on a basis of handwriting-information more and more accurately. The writer determining unit 106 supplies the selected name (name of person highly likely to be writer) to the image generating unit 107.

The image generating unit 107 obtains the selected name (name of person highly likely to be writer) from the writer determining unit 106. The image generating unit 107 generates a name-image indicating the name selected by the writer determining unit 106. Typically, the "name-image" is an image of a text indicating the name. The image generating unit 107 combines the generated name-image and the sheet-image obtained by the image obtaining unit 101 to thereby generate a combined-image (Step S216). For example, the image generating unit 107 combines the generated name-image and the name-field in the sheet-image obtained by the image obtaining unit 101 to thereby generate a combined-image. In other words, the image generating unit 107 generates a combined-image, in which a name is written in the blank name-field. The image generating unit 107 outputs (prints, saves, displays, sends, etc.) the generated combined-image (Step S217).

Meanwhile, the writer determining unit 106 determines that the generated searchable-table stores a plurality of names in association with the handwriting-information generated by the handwriting-information generating unit 103 (Step S214, NO). In this case, the writer determining unit 106 suspends identification of a writer, and treats the plurality of names as candidates for a writer (Step S218).

Then, the controller 11 of the MFP 10 executes the process of Steps S201 to S207 for the other sheet-images. The writer determining unit 106 deletes (excludes), from the searchable-table, the names and handwriting-informations (Step S207) additionally stored in the handwriting-information database 112 and updated by the impersonation determining unit 105 to thereby update the searchable-table (Step S219).

In other words, the writer determining unit 106 excludes a name and handwriting-information, which cannot be a candidate for a writer, from the searchable-table one by one to thereby narrow down the candidates for a writer. The writer determining unit 106 determines whether or not the updated searchable-table (in which candidates are narrowed down) stores only one name in association with the handwriting-information generated by the handwriting-information generating unit 103 (Step S220).

Where the writer determining unit 106 determines that the updated searchable-table (in which candidates are narrowed down) stores only one name in association with the handwriting-information generated by the handwriting-information generating unit 103 (i.e., there is only one non-excluded and remaining name), the writer determining unit 106 selects the one name (Step S220, YES). In this case, the person of the selected name may be highly likely to be a writer. So the writer determining unit 106 supplies the selected name (name of person highly likely to be writer) to the image generating unit 107. The image generating unit 107 generates a name-image indicating the name selected by the writer determining unit 106, generates a combined-image (Step S216), and outputs the generated combined-image (Step S217).

Meanwhile, where the writer determining unit 106 determines that the updated searchable-table (in which candidates are narrowed down) stores no name at all in association with the handwriting-information generated by the handwriting-information generating unit 103 (Step S220, NO, and Step S221, NO), the writer determining unit 106 displays a message (suspicious person is unidentified) on the display device 17a, and alerts a user (marker, etc.) (Step S211).

Meanwhile, where the writer determining unit 106 determines that the updated searchable-table (in which candidates are narrowed down) stores a plurality of names in association with the handwriting-information generated by the handwriting-information generating unit 103 (Step S220, NO, and Step S221, YES), the writer determining unit 106 displays the plurality of names as candidates on the display device 17a, and advises a user (marker, etc.) to specify whether or not a combined-image including any one name is to be generated (Step S222).

Where the writer determining unit 106 determines that a combined-image including a particular name (specified by user) is to be generated on a basis of a particular operation input in the operation device 17 by the user (Step S223, YES), the writer determining unit 106 generates a name-image indicating the name, generates a combined-image (Step S216), and outputs the generated combined-image (Step S217).

4. Modification Examples

In the aforementioned embodiment, the MFP 10 executes all the processes. Instead, an information processing apparatus may obtain sheet-images from an image scanner or an MFP, and may execute all the processes (not shown). The information processing apparatus may be a personal computer used by a user (marker, etc.) and connected to the image scanner or the MFP via an intranet. Alternatively, the information processing apparatus may be a so-called server apparatus connected to the image scanner or the MFP via the Internet. Alternatively, an external server apparatus may store the handwriting-information database 112 in a memory, and an information processing apparatus may obtain the handwriting-information database 112 via a communication device and may execute all the processes (not shown).

5. Conclusion

According to the present embodiment, where the name-field determining unit 104 determines that no name is written in a name-field in a sheet-image, the writer determining unit 106 determines a writer on a basis of handwriting-information indicating characteristics of each handwritten-character in the sheet-image generated by the handwriting-information generating unit 103. As a result, if no name is written in a name-field, the writer determining unit 106 can accurately determine a writer on a basis of handwriting-information. If there are a plurality of candidates for a writer, the writer determining unit 106 narrows down the candidates for a writer in association with a particular attribute, and can thereby determine a writer accurately.

According to the present embodiment, where the name-field determining unit 104 determines that a name is written in a name-field in a sheet-image, the impersonation determining unit 105 determines whether somebody has "impersonated" the person of that name and has handwritten the name, answers, and the like on this sheet, or not "impersonation" but the person of that name by himself has handwritten the name, answers, and the like on this sheet, on a basis of handwriting-information of characteristics of each handwritten-character in the sheet-image generated by the handwriting-information generating unit 103. As a result, where a name is written in a name-field, the impersonation determining unit 105 can determine presence/absence of possibility of "impersonation" more accurately.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a processor that operates as
an image obtaining unit that obtains a sheet-image obtained by scanning a sheet including a name-field, in which a name is to be handwritten, and handwritten-characters written in an area other than the name-field,
a character recognizing unit that recognizes the handwritten-characters in the sheet-image,
a handwriting-information generating unit that generates handwriting-information indicating characteristics of each character of the recognized handwritten-characters,
a name-field determining unit that determines whether or not a name is written in the name-field in the sheet-image,
a writer determining unit that,
where the name-field determining unit determines that no name is written,
extracts, from a database that stores one or more persons' names, the persons' attributes, and handwriting-informations of the persons in association with each other, one or more names and handwriting-informations in association with a particular attribute, and generates a table, and
selects one name stored in the table in association with the generated handwriting-information, and
an image generating unit that
generates a name-image indicating the selected name, and
combines the name-image and the sheet-image to generate a combined-image.

2. The information processing apparatus according to claim 1, wherein the handwriting-information generating unit supplies the generated handwriting-information in association with the selected name to the database.

3. The information processing apparatus according to claim 1, wherein
the image generating unit combines the name-image and the name-field in the sheet-image to generate the combined-image.

4. The information processing apparatus according to claim 1, wherein
the writer determining unit,
where the table stores a plurality of names in association with the generated handwriting-information,
treats the plurality of names as candidates,
excludes a name handwritten in a name-field of another sheet-image from the candidates, and
selects one non-excluded and remaining name.

5. The information processing apparatus according to claim 1, wherein
the processor further operates as
an impersonation determining unit that,
where the name-field determining unit determines that a name is written,
determines whether or not the generated handwriting-information is stored in the database in association with the name handwritten in the name-field, and
where the impersonation determining unit determines that the generated handwriting-information is not stored in the database in association with the name handwritten in the name-field,
extracts a name stored in the database in association with the generated handwriting-information.

6. The information processing apparatus according to claim 5, wherein
the impersonation determining unit,
where the impersonation determining unit determines that the generated handwriting-information is stored in the database in association with the name handwritten in the name-field,
supplies the generated handwriting-information to the database in association with the name handwritten in the name-field.

7. The information processing apparatus according to claim 1, further comprising:
a memory that stores the database.

8. The information processing apparatus according to claim 1, further comprising:
a communication device that obtains the database stored in a memory of an external server apparatus.

9. The information processing apparatus according to claim 1, further comprising:
an image scanner that scans the sheet and obtains the sheet-image.

10. The information processing apparatus according to claim 1, further comprising:
a printer that prints the combined-image.

11. A non-transitory computer readable recording medium that records an information processing program executable by a processor of an information processing apparatus, the information processing program causing the processor of the information processing apparatus to operate as
an image obtaining unit that obtains a sheet-image obtained by scanning a sheet including a name-field, in which a name is to be handwritten, and handwritten-characters written in an area other than the name-field,
a character recognizing unit that recognizes the handwritten-characters in the sheet-image,
a handwriting-information generating unit that generates handwriting-information indicating characteristics of each character of the recognized handwritten-characters,
a name-field determining unit that determines whether or not a name is written in the name-field in the sheet-image,
a writer determining unit that,
where the name-field determining unit determines that no name is written, extracts, from a database that stores one or more persons' names, the persons' attributes, and handwriting-informations of the persons in association with each other, one or more names and handwriting-informations in association with a particular attribute, and generates a table, and
selects one name stored in the table in association with the generated handwriting-information, and
an image generating unit that
generates a name-image indicating the selected name, and
combines the name-image and the sheet-image to generate a combined-image.

12. An information processing method, comprising:
obtaining a sheet-image obtained by scanning a sheet including a name-field, in which a name is to be handwritten, and handwritten-characters written in an area other than the name-field;
recognizing the handwritten-characters in the sheet-image;
generating handwriting-information indicating characteristics of each character of the recognized handwritten-characters;
determining whether or not a name is written in the name-field in the sheet-image;
where determining that no name is written,
extracting, from a database that stores one or more persons' names, the persons' attributes, and handwriting-informations of the persons in association with each other, one or more names and handwriting-informations in association with a particular attribute, and generating a table;
selecting one name stored in the table in association with the generated handwriting-information;
generating a name-image indicating the selected name; and
combining the name-image and the sheet-image to generate a combined-image.

* * * * *